ary Examiner—Louis G. Mancene
United States Patent [19]
Gunther

[11] 3,975,891
[45] Aug. 24, 1976

[54] MOWER BLADES
[76] Inventor: Roland Eric Gunther, R.D. No. 1 Box 282, New Berlin, N.Y. 13411
[22] Filed: Feb. 22, 1974
[21] Appl. No.: 444,786

[52] U.S. Cl. ................................. 56/295; 30/350
[51] Int. Cl.² ........................................ A01D 55/18
[58] Field of Search .......... 56/295; 30/350, 346.54, 30/346.60; 29/191.2, 190, 191.6; 76/101 R, 82.1; 228/107

[56] References Cited
UNITED STATES PATENTS

| 222,711 | 12/1879 | Lane | 30/350 |
|---|---|---|---|
| 230,948 | 8/1880 | Lane | 30/350 |
| 1,414,997 | 5/1922 | Zinn | 30/350 |
| 3,302,377 | 2/1967 | Ely | 56/295 |
| 3,313,633 | 4/1967 | Longo | 29/191.6 |
| 3,340,049 | 9/1967 | Quaas et al. | 29/191.6 |
| 3,342,626 | 9/1967 | Batchelor | 29/191.2 |
| 3,360,848 | 1/1968 | Saia | 228/107 |
| 3,369,354 | 2/1968 | Freedlander et al. | 56/295 |
| 3,428,442 | 2/1969 | Yurasko | 29/191.2 |

FOREIGN PATENTS OR APPLICATIONS
93,093   10/1938   Sweden ............................. 30/350

Primary Examiner—Louis G. Mancene
Assistant Examiner—James D. Hamilton

[57] ABSTRACT

This invention relates to mower blades made of metal with an inner layer of extremely hard material and so devised that attrition in use serves to maintain a sharp cutting edge.

16 Claims, 6 Drawing Figures

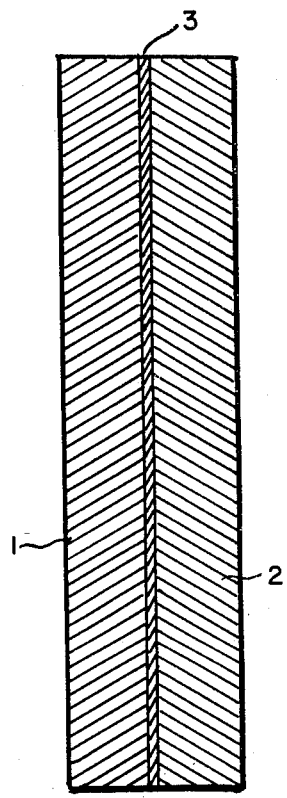
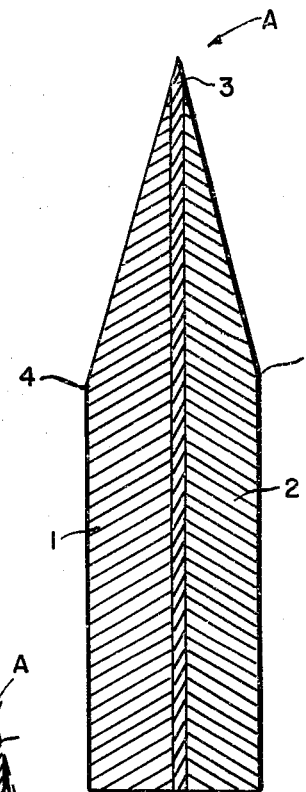
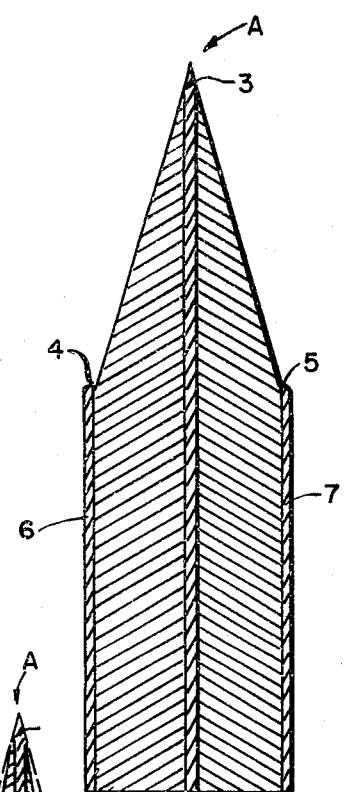
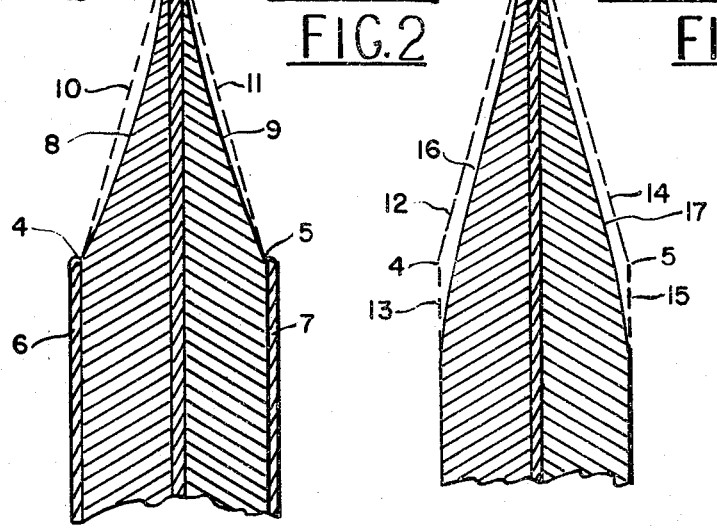
FIG.1  FIG.2  FIG.3  FIG.4  FIG.5

MOWER BLADES

BACKGROUND OF THE INVENTION

1. Field of the Invention

This invention relates to mower blades for rotary mowers, whose salient characteristics are provided by the incorporation of wear-resistant layers of finely divided ultra-hard particles to those portions of the blades that are most subject to attrition in use.

2. Description of the Prior Art

Mower blades manufactured up until the present are made of steel whose cutting properties are quite definitely less than the optimum obtainable. This is not for lessening the cutting efficiency, but is due to safety considerations. Cutting properties in steel are related to hardness, and this in turn implies brittleness.

In a consumer item such as a mower that has a high-speed rotating part which is possibly subject to some abuse, such as striking stones or cement curbing, a blade that might let fly hard pieces due to brittleness cannot be tolerated. This has resulted in the use of mild steel and the sacrifice of durable cutting edges. The user pays for the safety factor in loss of efficiency at best and a rapid lowering of even this modest level of efficiency as the cutting blade turns into a rounded-edge flail during use. The rapid degradation of the cutting edge makes the mowing process take more time and waste fuel.

It is most desirable to have a means whereby a mower blade made substantially of mild steel can have a durable cutting edge without sacrificing the relatively safe characteristics of the conventional type. The use of this type of blade can be expected to provide savings in fuel, which when considering the millions of mowers in use, can can add up to really meaningful quantities.

SUMMARY OF THE INVENTION

In order to obtain resistance to dulling of the functional knife-edges of a steel mower blade a layer of ultra-hard material such as diamond or carbide or nitride or other similar material, in finely divided form, is embedded in the blade in the plane in which the knife edges are located. Wear that takes place is greater at the plain steel surfaces than where the harder material is embedded and partially exposed. The differential wearing effect favors maintenance of a profile having an edge-like protrusion. In addition, in order that the steel can maintain its support of the inner layer of hard particles, provision is also made to prevent it from wearing excessively by application of wear-resistant cladding on the outside surfaces of the blade in the cutting zones. This outside cladding also depends upon finely-divided ultra-hard inclusions for its durability.

BRIEF DESCRIPTION OF THE DRAWINGS

The drawings are all sectional views with the exception of FIG. 6, which is a plan view.

FIG. 1 shows a view through the stock material for the mower blade.

FIG. 2 shows a mower blade with sharpened cutting edge.

FIG. 3 shows a sharpened mower blade with cladding on the unsharpened mower blade body.

FIG. 4 shows a clad-body blade after some use and FIG. 5 shows the contours of an unclad blade after some use.

DESCRIPTION OF THE PREFERRED EMBODIMENTS

Figure 6:
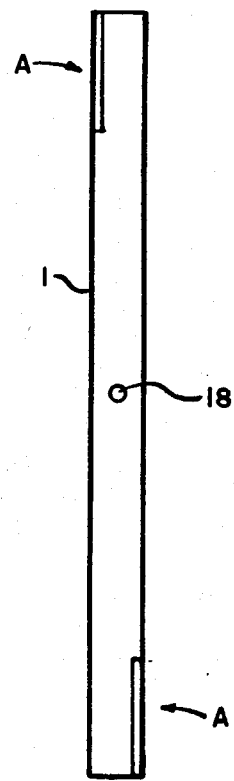
FIG. 6 shows a plan view of an entire mower blade.

Taken in more detail, FIG. 1 shows a sectional view of a body layer 1 of ferrous metal, a sub-body layer 2 of similar metal, and between the two ferrous metal layers a very thin layer 3 of an extremely hard material such as diamond dust or silicon, boron or tungsten carbide.

FIG. 2 shows essentially the same construction of FIG. 1 wherein a cutting edge, indicated by an arrow and the letter A, has been created by shaving stock from the body layer 1 to form a shoulder 4 and stock from the sub-body layer 2 to form the corresponding shoulder 5, on the opposite side.

FIG. 3 shows the construction of FIG. 2 with the addition to the intact portion of body layer 1 of a surface cladding 6 of harder material, and with a similar addition to the intact portion of sub-body layer 2 of a surface cladding 7.

FIG. 4 shows a portion of clad mower blade in the cutting area of the composite with body layer 1, sub-body layer 2 as in FIG. 3; also hard-surfacings 6 and 7 on body and sub-body respectively. Cutting edge A is also shown. The contour of the body layer 1 after some wear is indicated by curved line 8 with the original contour represented by dashed line 10. Wear contour line 9 indicates the shape of sub-body 2 in the area between the edge A and shoulder 5, with the original contour of this side shown in dashed line 11. Hardened interlayer 3 is also shown as previously.

FIG. 5 shows the construction of FIG. 2 as it appears after wear. In this Figure the original contours of the body layer 1 are indicated by dashed lines 12 and 13 and the original contours of sub-body 2 by dashed lines 14 and 15. The after-wear contour of body 1 is shown by the line 16 and of sub-body 2 by line 17. Notable in this view is the disappearance in the remaining body material of shoulders 4 and 5.

FIG. 6 shows a mower blade of the present invention in its entirety as a plan view, with a body 1 in the form of an elongated flat member provided with a centrally located hole 18 through which may be inserted a bolt, not shown, for attaching the blade to a rotary type mowing machine, not shown. At the extremities of the blade body 1 are cutting portions indicated at A,A.

In the practice of this invention a blade is first provided such as is shown in FIG. 1. It consists of two ferrous metal layers here called body 1 and sub-body 2, with an interlayer 3 between them. For purposes of illustration in the drawing, the interlayer 3 has had to be shown with some appreciable thickness; in actuality in this invention this layer is extremely thin and of the order of thickness of a knife near its edge. It is made this way by spreading a fine layer of a very hard material such as diamond dust or powdered silicon carbide or another similarly hard carbide on one of the body layers, placing the other body layer upon the interlayer and joining the whole into one composite by a process such as Du Pont's Detacladding Process.

The Du Pont Detacladding Process is a method of joining metals by the force of explosives. In brief, it consists of bringing two metal surfaces into close proximity, placing a layer of explosive on the outside of one or both of the metals to be joined, then forcing them together by the action brought about by detonation of the explosive whereby the surfaces join into a uniform weld.

The interlayer 3 need not be discrete and absolutely continuous. For the production of an improved weld between body layers the interlayer while still in powder form may be sonically vibrated into patterns of greater or lesser density so that the base metal can bridge to a sound bond, or some of the ferrous base material also in powdered form may be added to the extremely hard powder to provide a monolithic composite.

The composite thus produced is shaped as shown in the drawings to provide a cutting edge A. In the preferred form of the invention the intact portion of the blade, at least adjacent to the shaped portion, is provided with a hard face such as is produced the Metco or the Wall Colmonoy process, to yield a constuction essentially as shown in FIG. 3.

The Metco or Wall Colmonoy processes provide means whereby coatings are deposited on surfaces by spraying the coating material in molten condition and in finely dispersed form onto them. This type of application is widely known as "flame spraying."

With the construction described, use of the mower blade in conventional fashion to cut grass provides hard wear-resistant surfaces at shoulders 4 and 5 and a sharp edge at the apex A. Wear is inevitable, but it is limited by having to intrude below a bridge contour formed between shoulder 4 and apex A on one side and shoulder 5 and apex A on the other. As soon as some wear has undercut the area, its accessibility to the wearing effects is further reduced, thus slowing it down even more.

The particular benefit accruing from the construction shown lies in the formation and maintenance of a fine cutting edge as a result of wear, instead of the dulling that usually takes place.

The additional advantage provided by hard-surfacing of the body layers may not be immediately apparent for the fact that the areas so treated are away from the cutting edge. That the actual benefit is substantial is shown by the type of wear that occurs without such hard-surfacing illustrated in FIG. 5 where the wear outline 16 on the one side and 17 on the other, from the original outline indicated by dashed lines 12, 13 and 14, 15 respectively shows a narrowing influence on the whole. This narrowing influence as an over-all effect and in particular in the vicinity of the edge A tends to leave the remaining hard material of interlayer 3 at the cutting edge unsupported and subject to rapid failure. The presence of the hard material in the interlayer still uses differential wear rates to maintain a cutting edge, but the hard-surfacing described equalizes the wear by presenting a similar degree of resistance to it at the shoulders 4 and 5 and the edge A. In this way the geometry is essentially maintained as the whole wears back.

The choice of materials from which the interlayer 3 is made can be defined in terms of the Knoop Scale of hardnesses. Diamond with an index of 7000 at the top of the scale is most desirable, but lower in cost are others; among them are oxides, carbides, nitrides and borides ranging in hardness down to around 1500. There are even steels available that approach this range, and with the present emphasis on recycling a reasonably priced blade can be made with comminuted razor steel in the interlayer. In order to maintain an adequate differential in wear characteristics a milder steel body should be used with lower Knoop values in the interlayer.

With the construction of this invention, the portions of the mower blade that need to be hard are supported by relatively large masses of ductile metal. It provides an efficient cutting instrument with no sacrifice in safety.

I claim:

1. In a mower blade for use on rotary type mowers a flat steel body, said body having cutting portions at its extremities, each said cutting portion having a knife edge, each of said cutting portions further comprising a composite of a layer of comminuted hard material between two layers of steel, and disposed in a plane parallel to the flat surfaces of said steel body so as to extend into and substantially embody the knife edge of each of said cutting portions.

2. The construction of claim 1 wherein the said hard comminuted material comprises crushed cutlery steel.

3. The construction of claim 1 wherein the said hard comminuted material comprises Tungsten Carbide Alloy having a Knoop hardness of 1400 to 1800.

4. The construction of claim 1 wherein said hard comminuted material comprises Zirconium Boride.

5. The construction of claim 1 wherein said hard comminuted material comprises Titanium Nitride.

6. The construction of claim 1 wherein said hard comminuted material comprises Tungsten Carbide.

7. The construction of claim 1 wherein said hard comminuted material comprises Tantalum Carbide.

8. The construction of claim 1 wherein said hard comminuted material comprises Zirconium Carbide.

9. The construction of claim 1 wherein said hard comminuted material comprises Alumina.

10. The construction of claim 1 wherein said hard comminuted material comprises Beryllium Carbide.

11. The construction of claim 1 wherein said hard comminuted material comprises Titanium Carbide.

12. The construction of claim 1 wherein said hard comminuted material comprises Silicon Carbide.

13. The construction of claim 1 wherein said hard comminuted material comprises Aluminum Boride.

14. The construction of claim 1 wherein said hard comminuted material comprises Boron Carbide.

15. The construction of claim 1 wherein said hard comminuted material comprises Diamond.

16. In a mower blade for use on rotary type mowers the construction of claim 1 wherein said flat steel body is further surface clad on both flat sides in said cutting portions.

* * * * *